United States Patent [19]

Oetiker

[11] 4,003,238
[45] Jan. 18, 1977

[54] MECHANISM FOR INSTALLING HOSE BAND CLAMPS

[76] Inventor: Hans Oetiker, Oberdorfstrasse 21, 8810 Horgen, Switzerland

[22] Filed: July 8, 1975

[21] Appl. No.: 594,001

[30] Foreign Application Priority Data

July 8, 1974 Switzerland .................. 9365/74

[52] U.S. Cl. .................. 72/410; 29/700; 29/280; 81/9.3
[51] Int. Cl.² .................. B21D 9/08
[58] Field of Search ........... 72/410, 409, 412, 407, 72/452; 81/9.3; 29/280, 200 H, 237; 24/20 CW; 140/106

[56] References Cited

UNITED STATES PATENTS

| | | | |
|---|---|---|---|
| 2,011,877 | 8/1935 | Shaff | 72/407 |
| 2,396,562 | 3/1946 | Forss | 72/410 |
| 2,647,814 | 8/1953 | Chilton | 72/410 |
| 3,082,498 | 3/1963 | Oetiker | 24/20 CW |
| 3,257,874 | 6/1966 | Madeira | 81/9.3 |
| 3,402,436 | 9/1968 | Oetiker | 24/20 CW |

*Primary Examiner*—C.W. Lanham
*Assistant Examiner*—Gene P. Crosby
*Attorney, Agent, or Firm*—Craig & Antonelli

[57] ABSTRACT

A tool for installing hose band clamps provided with at least one ear, which is equipped with two pincer jaws movable relative to one another for pressing the roots of the ear against one another and thereby clamp together the band clamp. A spacing member provided with an aperture for the ear is provided in the tool which shields the tool clamping jaws and holds the hose onto a nipple while the ear is being contracted so as to prevent the hose material from being squeezed into the space between the roots of the ear.

25 Claims, 10 Drawing Figures

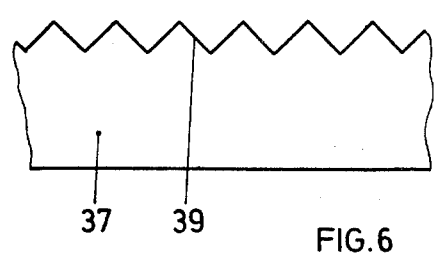
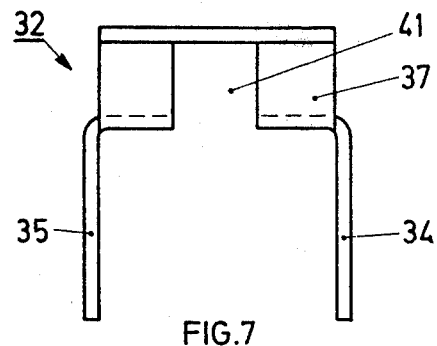
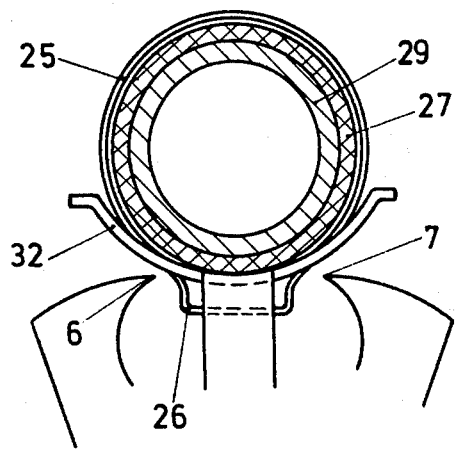
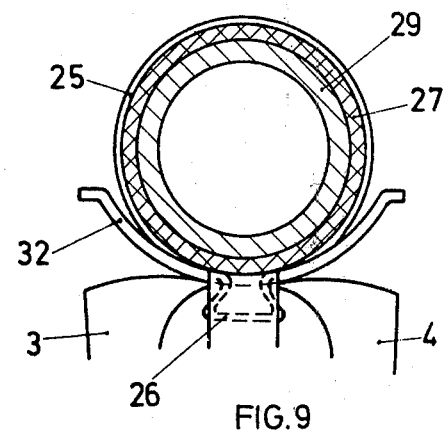
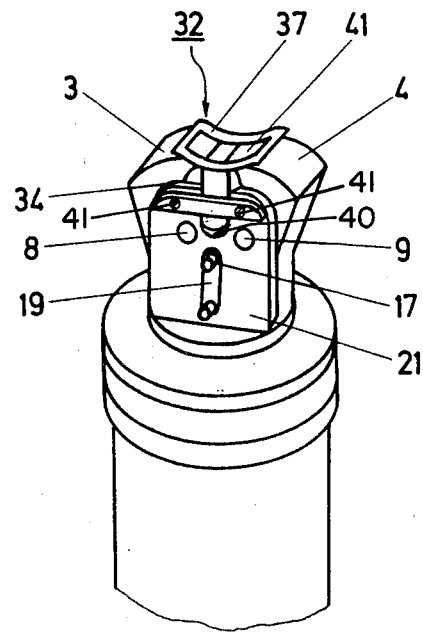

MECHANISM FOR INSTALLING HOSE BAND CLAMPS

The present invention relates to a mechanism for applying or installing hose band clamps provided with at least one ear, which includes two movable pincer jaws movable relative to one another for pressing the ear roots against one another.

It is known in the art to mount or install hose band clamps provided with so-called ears with the aid of pincers or pliers in that one clamps together the ears at the transition places into the hose band, properly speaking, i.e. at their roots and in that one obtains thereby a reduction of the hose band and therewith a compressing action clamping fast the hose onto an interior part, for example, onto a nipple. This operation, however, entails the great disadvantage that without special measures, the hose to be sealed off is pressed or squeezed into the space of the ear of the hose band clamp during the contracting and tightening operation and a correct, complete closing of the ear, in the course of which the root places of the ear contact one another, cannot therefore be realized because the hose is squeezed and clamped in between these root places, which not only damages the hose but also results in an incorrect and improper binding-off place due to the slight contraction and therwith due to the lack of a sufficiently tight contact which develops leaks.

Heretofore, this problem was counteracted in that one installed within the area of the ears of such hose band clamps, so-called bridge members which were made of thin-walled material, were curved in the direction of the hose and also were provided with a reinforcing groove in this direction. The reinforcing groove prevented a collapse-like deformation during the contraction of the band clamp. For purposes of an easier and safer installation, the cross section of the bridge member was chosen to be U-shaped whereby the laterally upwardly projecting wall portions of this bridge member exceed the band thickness by a slight amount. These bridge members were mounted in such a manner that they bridged over the spaces resulting at the ear or the ears and were intended to prevent thereby that the tubular member or hose to be sealed off was squeezed into the space during the closing of the ear or ears.

Especially the use of automatic pincers or pliers for the installation of such hose band clamps entailed with large clamps and thus with large ears the danger that during the installation a finger would be inserted between the ear and the rubber hose due to inattention and accidents could occur during the actuation of the automatic pincer tool.

The present invention aims at providing a mechanism for installing hose band clamps which not only dispenses with the installation of such bridge members but also avoids the disadvantages connected therewith of economic and assembly nature and additionally makes impossible a penetration of the hose into the area of the ear. A further purpose resides in the improvement of the mechanism with respect to accident danger. In that regard, the tool mechanism according to the present invention is characterized in that there is provided a spacing member provided with an aperture for the ear which shields the two clamping jaws.

The mechanism according to the present invention enables the installation and closing of an ear-type hose band clamp without requiring a bridging member for the protection of the hose to be sealed. The relatively costly bridge members as well as the assembly thereof can thereby be dispensed with whereby additionally also the certainty exists that a damaging of the hose and/or a non-tight connection can be prevented.

These and other objects, features and advantages of the present invention will become more apparent from the following description when taken in connection with the accompanying drawing which shows, for purposes of illustration only, one embodiment in accordance with the present invention, and wherein:

FIG. 6 is a partial side elevational view of the spacing member illustrated in FIG. 5, viewed in the longitudinal direction of the grooves;

FIG. 7 is a side elevational view of the spacing member according to FIG. 5;

FIG. 8 is a view, similar to FIG. 2, illustrating also the upper part of the assembly tool and spacing member mounted thereon;

FIG. 9 is a view similar to FIG. 8, after the assembly of the hose band clamp according to FIG. 3; and FIG. 10 is a perspective view of the pincer tool according to FIG. 1 with the spacing member mounted thereon.

Figure 1:
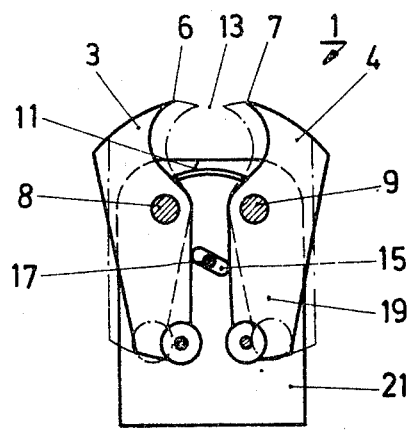
FIG. 1 is a somewhat schematic side elevational view of the head of a pneumatically operated assembly pincer tool with the bearing plate thereof removed and in the open position, with the full lines indicating the position thereof for large hose band clamps and large ears and with the dash and dot lines indicating the position thereof for small hose band clamps and small ears.

Referring now to the drawing wherein like reference numerals are used throughout the various views to designate like parts, a pincer head generally designated by reference numeral 1 of a pincer tool for the installation of hose band clamps is illustrated in FIG. 1. This head 1 includes two pincer jaws 3 and 4 with clamping edges 6 and 7. The jaws 3 and 4 are pivotally supported on separate bearing bolts 8 and 9. A connecting opening-spring 11 assures the uniform movement of the pincer jaws 3 and 4. The mouth opening 13 of the pincer is visible between the clamping edges 6 and 7.

An adjusting eccentric 15 is pivotally supported on a bearing bolt 17. The latter is operatively connected with an adjusting arm 19 (FIG. 10) whereby the adjusting eccentric 15 can be rotated through 90° by the to and fro pivoting of the adjusting arm 19. The bearing bolts 8, 9 and 17 are retained in two bearing plates 21, of which only one is visible in FIG. 1. The two pincer jaws 3 and 4 are spread apart in the lower portion thereof by a corresponding conventional actuating mechanism (not shown) so that they pivot about the bearing bolts 8 and 9 and the mouth opening 13 is reduced thereby. This opening 13 can be correspondingly matched to the width of the ear of the hose band clamp to be installed by the adjustment of the arm 19 and by the pivoting of the eccentric 15.

Figure 2:
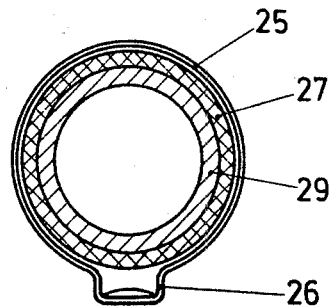
FIG. 2 is a view of a single-ear hose band clamp placed over a hose and a nipple (shown in cross section with the hose band clamp in the non-fastened condition.

A single-ear hose band clamp 25 with an ear 26 as well as a hose 27 is illustrated in FIG. 2, which is to be sealingly fastened onto a nipple 29 by means of the hose band clamp 25. The single-ear hose band clamp 25 is thereby loosely placed over the hose 27.

Figure 3:
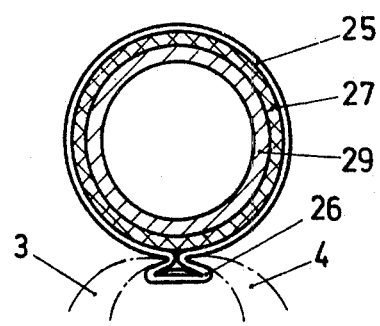
FIG. 3 is a view similar to FIG. 2 with the single-ear hose band clamp in the installed position.

In FIG. 3, the arrangement according to FIG. 2 is visible, however, with the hose band clamp 25 in the installed condition. It follows therefrom that the hose band clamp 25 has been contracted so as to closely surround the hose 27. This is so as for purposes of assembly, the ear 26 is seized at its roots by the pincer jaws 3 and 4 and these places are pressed against one another by the actuation thereof. A permanent deformation takes place as can be seen from FIG. 3.

Figure 5:
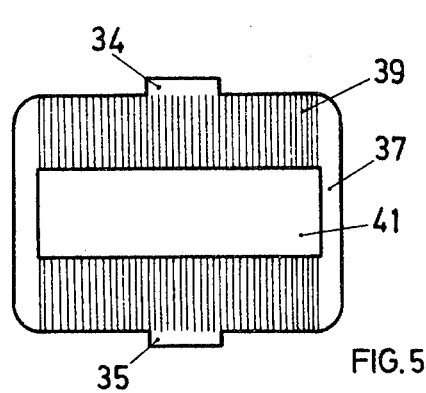
FIG. 5 is a plan view, analogous to FIG. 4, illustrating a spacing member provided with a transverse serration and laterally bent off guide lugs.
Figure 4:
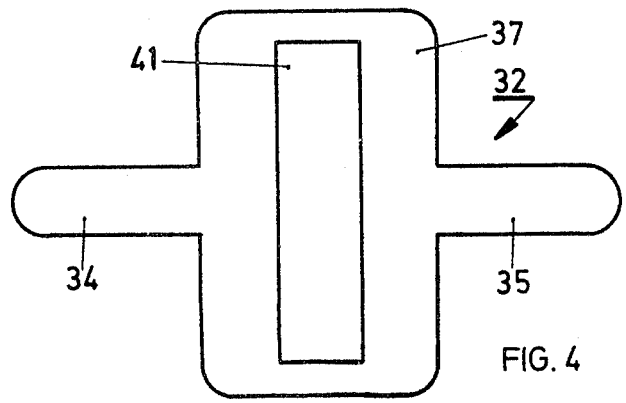
FIG. 4 is a plan view on a spacing member with bent-up lateral guide lugs.

FIG. 4 shows the core member, properly speaking, in an unfolded shape, namely, a spacing member generally designated by reference numeral 32 having two lateral guide lugs 34 and 35 as well as a hose support 37. FIG. 5 illustrates the spacing member 32 with the two guide lugs 34 and 35 in the bent-off condition as used. The lugs 34 and 35 are slidably received within grooves 40 in the pincer-like mechanism to enable displacement thereof and therewith of the spacing member 32 in a direction perpendicular to the pivot movements of the pincer jaws 3 and 4 about their bearing bolts 8 and 9 (FIG. 10). To normally retain the lugs 34 and 35 in their proper position, a retaining plate 41 is threadably secured to the pincer head 1. The hose support 37 is provided with a transverse serration or grooving 39 as well as with an aperture slot 41 for receiving a single-ear hose band clamp, for example, of the hose band 25 with the ear 26.

FIG. 6 illustrates a partial section, on an enlarged scale, of the transverse grooving 39 of the hose band support 37, whereas FIG. 7 represents a side elevational view of the spacing member 32 as it is visible from FIG. 5.

FIG. 8 illustrates a section of the pincer-head 1 in the sense of FIG. 1 as well as an arrangement ready for assembly according to FIG. 2. The ear 26 of the single-ear hose band clamp 25 projects through the slot-shaped aperture 41 of the spacing member 32. The two pincer jaws 3 and 4 and their clamping edges 6 and 7 are matched to the width of the ear 26 by the pivoting of the eccentric 15 so that the clamping edges 6 and 7 are located at the root places of the ear 26. The hose 27 rests on both sides of the end faces of the clamp 25 on the hose support 37 of the spacing member 32.

If now the pincers are actuated manually or pneumatically, then the pincer jaws 3 and 4 are being pressed against one another whereby the ear 26, i.e. the root portions thereof are pressed against one another as illustrated in FIG. 3. The circumference of the single-ear hose band clamp 25 is reduced during this operation. The band clamp 25 abuts at the hose 27 and presses the same with the predetermined force onto the nipple 29 so that a pressure-resistant, tight connection results between the hose 27 and the nipple 29. During this operation, the spacing member 32 is pressed against the hose 27 on both sides of the lateral end faces of the single-ear hose band clamp 25. The clamp 25 is contracted by the pivot movement of the two pincer jaws 3 and 4 and the ear 26 is being pulled away from the spacing member 32 according to the kinematics of the tool so that the pushing together of the root portions of the ear 26 takes place underneath the spacing member 32 and therewith underneath the hose 27 and outside of this hose. It becomes thereby impossible that during the assembly operation and during the clamping together of the ear 26 hose portions penetrate the space laid open by the ear into the ear interior and are wedged and clamped in and damaged during the last part of the assembly by the compressed ear roots so that a leakage of the connection between the hose and nipple does not occur with the use of the tool of the present invention. By reason of the fact that the spacing member 32 is being pushed away from this critical place of the ear roots, conditioned by the movement of the pincer jaws 3 and 4 and the clamping place thereof, as given by the clamping edges 6 and 7, and by reason of the fact that the ear 26 of the clamp moves away from the hose support 37 during the clamping movement, a wedging and clamping-in and thus a damaging of the hose or an incorrect assembly of the hose band clamp is rendered impossible.

In this manner, as illustrated in FIG. 9, a completely satisfactory connection can be obtained and the insertion of a so-called bridge member between the roots of the ear 26 can be dispensed with. This means a considerable saving in time and material and additionally increases the safety of the connection between the hose and the nipple or a corresponding hose connection.

FIG. 10 illustrates in perspective view somewhat schematically the head portion of such an assembly pincer tool with an installed spacing member 32. Also, the remaining parts as have been explained hereinabove, can be seen from this drawing.

Instead of an assembly tool actuatable, for example, by means of compressed air, a manually actuated pincer may, of course, be used analogously. As can be shown from FIG. 10, the spacing member 32 is held and guided in a conventional manner on both sides thereof in the bearing plates 21 with the aid of the lateral guide lugs 34 and 35 suitably guided therein. The spacing member 32 is being forced away from the ear 26 by the two pincer jaws 3 and 4 during the clamping operation which is attained by the corresponding configuration of the pincer jaws 3 and 4 and the movement thereof. It is in fact the same pincer jaws which, on the one hand, press the spacing member 32 away from themselves and, on the other, with the clamping edges 6 and 7 of these jaws 3 and 4 pull the ear 26 of the hose band clamp away from the spacing member 32. The spacing member 32 is displaceably connected with the pincer mechanism by means of the lugs 34 and 35 so as to be displaceable in a direction generally perpendicular to the pivot axes of bearing bolts 8 and 9, i.e., in a direction in alignment with the overall axis of the tool, preferably in an interchangeable manner, whereby the lugs 34 and 35 slide within corresponding grooves 40 provided in the bearing plates 21. Since the details of such connection involve conventional means, a detailed description thereof is dispensed with herein.

It is, of course, also possible to fasten multi-ear hose-band clamps in this manner, possibly automatically with a number of tools or assembly pincers corresponding to the number of clamps or ears.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

What is claimed is:

1. A pincer-type mechanism for installing on a tubular member a hose band clamp provided with axial end faces and including at least one ear, which comprises two pincer jaw means movable relative to one another for pressing the roots of the ear against one another, characterized in that the mechanism also includes a spacing means provided with an aperture means for the ear, said spacing means being operable to shield the jaw means with respect to the tubular member to be clamped fast.

2. A pincer mechanism according to claim 1, characterized in that the outer surfaces of the pincer jaw means facing the spacing means have a convex curvature and the lower surface of the spacing means which faces the outer surfaces of the pincer jaw means has a convex curvature.

3. A mechanism according to claim 1, characterized in that the spacing means is operable to hold the tubular member onto another member at both end faces within the area of the ear while the ear is being contracted.

4. A mechanism according to claim 3, characterized in that the spacing means is of cylindrical form.

5. A mechanism according to claim 4 having a pincer-like head portion, characterized in that the spacing means is interchangeably connected with the pincer-like head portion of the mechanism.

6. A mechanism according to claim 4, characterized in that the spacing means includes a hose support means as well as an aperture means provided in said support means, said aperture means being operable to receive and enable extension therethrough of the hose band clamp and its ear.

7. A mechanism according to claim 6, characterized in that the support means has a grooved surface.

8. A mechanism according to claim 7, characterized in that the spacing means is operatively connected with the pincer-like mechanism to be displaceable in a direction perpendicular to the pivot movements of the pincer jaw means.

9. A mechanism according to claim 8, characterized in that the spacing means includes lateral guide lugs slidable within grooves of the pincer-like mechanism.

10. A pincer mechanism according to claim 9, characterized in that the outer surfaces of the pincer jaw means facing the spacing means have a convex curvature and the lower surface of the support means of the spacing means which faces the outer surfaces of the pincer jaw means has a convex curvature.

11. A mechanism according to claim 10, characterized in that the pincer jaw means are pivotal about two separate axes.

12. A mechanism according to claim 11, characterized by adjusting means for adjusting the mouth opening of the pincer jaw means in the opened end position thereof.

13. A pincer mechanism according to claim 12, characterized in that the adjusting means includes an adjusting member disposed externally at the pincer head.

14. A pincer mechanism according to claim 13, characterized in that the adjusting means includes an adjusting eccentric.

15. A mechanism according to claim 14 having a pincer-like head portion, characterized in that the spacing means is interchangeably connected with the pincer-like head portion of the mechanism.

16. A mechanism according to claim 1, characterized in that the pincer jaw means are pivotal about two separate axes.

17. A mechanism according to claim 1, characterized by adjusting means for adjusting the mouth opening of the pincer jaw means in the opened end position thereof.

18. A pincer mechanism according to claim 17, characterized in that the adjusting means includes an adjusting member disposed externally at the pincer head.

19. A pincer mechanism according to claim 17, characterized in that the adjusting means includes an adjusting eccentric.

20. A mechanism according to claim 1, characterized in that the spacing means includes a hose support means as well as an aperture means provided in said support means, said aperture means being operable to receive and enable extension therethrough of the hose band clamp and its ear.

21. A mechanism according to claim 20, characterized in that the support means has a grooved surface.

22. A mechanism according to claim 1, characterized in that the spacing means is operatively connected with the pincer-like mechanism to be displaceable in a direction perpendicular to the pivot movements of the pincer jaw means.

23. A mechanism according to claim 22, characterized in that the spacing means is of cylindrical form.

24. A mechanism according to claim 22, characterized in that the spacing means includes lateral guide lugs slidable within grooves of the pincer-like mechanism.

25. A mechanism according to claim 22 having a pincer-like head portion, characterized in that the spacing means is interchangeably connected with the pincer-like portion of the mechanism.

* * * * *